(12) United States Patent
Morse

(10) Patent No.: US 6,224,452 B1
(45) Date of Patent: May 1, 2001

(54) RADIO CONTROLLED AERIAL DISC

(76) Inventor: Stewart H. Morse, 1634 E. Hamilton Ave., Flint, MI (US) 48506

( * ) Notice: Subject to any disclaimer, the term of this patent is extended or adjusted under 35 U.S.C. 154(b) by 0 days.

(21) Appl. No.: 09/395,706

(22) Filed: Sep. 14, 1999

Related U.S. Application Data

(60) Provisional application No. 60/100,198, filed on Sep. 14, 1998.

(51) Int. Cl.$^7$ ...................................................... A63B 65/10
(52) U.S. Cl. ................................................ 446/46; 446/57
(58) Field of Search ........................... 446/57, 60, 37–48

(56) References Cited

U.S. PATENT DOCUMENTS 3,518,788 * 7/1970 Sides .
4,272,041 * 6/1981 Mabuchi et al. .
4,461,436 * 7/1984 Messina .
5,836,545 * 11/1998 Arlton et al. .

* cited by examiner

*Primary Examiner*—Kien T. Nguyen
(74) *Attorney, Agent, or Firm*—Plunkett & Cooney; Arnold S. Weintraub

(57) ABSTRACT

A radio controlled aerial disc capable of flight in any direction when airborne. The invention provides upper and lower body portions which form a disc shaped housing when connected. Within the housing there is a servo motor and drive assembly coupled to a quadripartite blade to provide lift and motion to the aerial disc. A servo control mechanism and a rear prop assembly are also components of the invention for controlling the movement of the aerial disc. A receiver mounted on the aerial disc provides a method of receiving signals from a remote transmitter to control the movement of the aerial disc.

7 Claims, 6 Drawing Sheets

FIG 4C
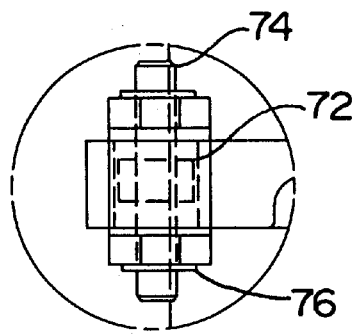
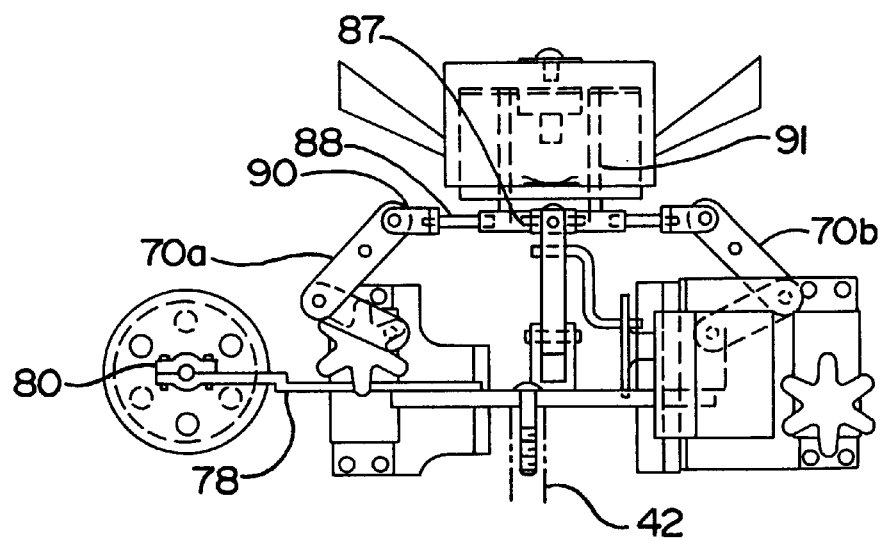
FIG 4D

RADIO CONTROLLED AERIAL DISC

CROSS-REFERENCE TO RELATED APPLICATIONS

This application is a completion application of a co-pending U.S. Provisional Patent Application Serial No. 60/100,198 entitled "Radio Controlled Disc" filed Sep. 14, 1998, the disclosure of which is hereby incorporated by reference.

STATEMENT REGARDING FEDERALLY SPONSORED RESEARCH OR DEVELOPMENT

Not applicable.

BACKGROUND OF THE INVENTION

Field of the Invention

The present invention concerns remote controlled flying objects, for surveillance or recreational purposes. More particularly, the present invention concerns aerial disc-shaped objects controlled by a radio frequency device.

The present invention, as detailed below, provides an aerially propelled disc-shaped object that is controlled by a radio frequency device.

As is known to those skilled in the art to which the present invention pertains, the recreational and non-recreational market for remotely controlled aerially propelled objects currently is void of disc-shaped objects. The present invention provides a disc-shaped object that is able to be aerially propelled and variably controlled by way of a hand-held radio or transmitter device. The present invention, thus, provides an object that fills the void of disc-shaped objects in the recreational and nonrecreational market of aerially propelled remote controlled objects that possess the maneuverability of axially revolving in mid-air.

BRIEF SUMMARY OF THE INVENTION

It is therefore, the purpose of the present invention to cure those deficiencies outlined above by providing a remote controlled aerial disc capable of movement in any direction, when airborne. Thus, in accordance with the present invention there is provided an aerial disc-shaped object comprising:

a) a framework comprising: an upper body, a lower body, the upper body being connected to the lower body, the bodies cooperating to define a housing;

b) an automatic feedback control system disposed on the framework;

c) a servo motor assembly mounted on the lower body for control of mechanical motion, the servo motor assembly having a steering mount;

d) a tiltable steering assembly mounted on the servo motor by the steering mount;

e) a servo rear prop assembly, mounted on the lower body to enable aerial control;

f) a belt adjustor assembly mounted on the lower body for controlling the spinning of the frame;

g) a rotatable main quadripartite blade assembly connected to the servo motor and extending into the upper body; and h) a receiver and remote transmitter system for receiving signals from a transmitter for remotely controlling the object.

BRIEF DESCRIPTION OF THE SEVERAL VIEWS OF THE DRAWING

FIG. 4C is a view of a steering arms connection mechanism;

FIG. 4D is a side view of the steering block assembly; and

DETAILED DESCRIPTION OF THE INVENTION

Figure 1A:
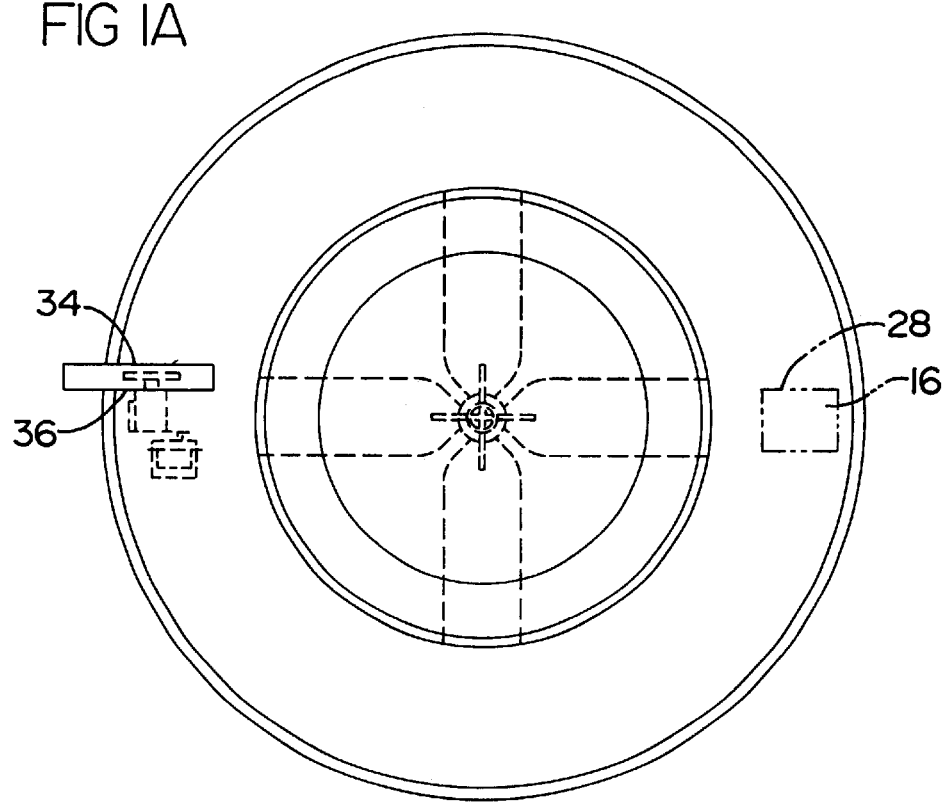
FIG. 1A is a top view of a radio controlled disc in accordance with the present invention.
Figure 1B:
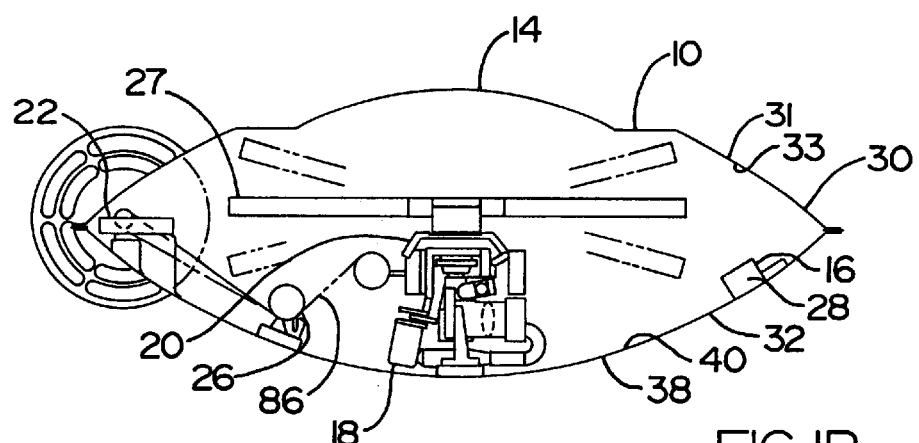
FIG. 1B is a cross-sectional view of a radio controlled disc in accordance with the present invention.

With reference to FIGS. 1A and 1B the aerially propelled object 10 which is preferably disc-shaped, generally, comprises a preferred disc shaped framework conposed of a lower body 32 and an upper body 30 which cooperate to define a housing 14. The object further includes an automatic feedback control system 16 for importing signals for mechanical motion to the object 10 which is disposed on the framework 12. The object further includes a servo motor assembly 18 for control of mechanical motion. The object also includes a tiltable steering block assembly 20 that enables directional changes of the object 10 when in aerial motion. The object also contains a servo rear prop assembly 22 to enable aerial control and maneuverability, such as lessening counter spinning of the object 10. The rear prop assembly 22 includes a right rear cover 34 and a left rear cover 36 which encloses the prop assembly. The object also includes a tiltable belt adjustor assembly 26 for controlling the spinning of the framework 12 by way of the servo rear prop assembly 22. Further the object includes a rotatable main quadripartite blade assembly 27 which rotates to both lift and impart aerial motion to the object 10. Finally, the object includes a receiver system 28 for receiving signals from a transmitter (not shown), remotely controlled and operated by a user from a remote location, for remotely controlling the object 10.

With more particularity and with reference to FIGS. 1A and 1B the upper body 30 attaches to the lower body 32 by any suitable means, such as by any type of fastening or locking mechanism or friction fit or gluing. The upper body 30 is an arcuate member having a first side 31 and a second side 33. The first side 31 is a convex side defining a top outside portion, and the second side 33 is the concave side functioning as the top inside portion of the present invention. Similar to the upper body 30, the lower body 32 is also an arcuate member having a first side 38 and a second side 40. The first side 38 is the convex side functioning as the bottom outside portion, and the second side 40 is the concave side a bottom inside portion of the housing. The upper body 30 encloses a plurality of members, as described below, and is mounted to the lower body 32 and attaches thereto.

Generally, the servo motor assembly denoted in FIG. 18 attaches to the second side 40 of the lower body 32. The steering block assembly 20 mounts upwardly to the servo motor assembly 18 by way of a steering mount 42. Moreover, the main quadripartite blade 27 extends above the steering block assembly 20 and beyond the lower body region into upper body region. Additionally, the belt adjustor assembly 26 and the servo rear prop assembly 22 are attached to the second side 40 of the lower body 32, the belt adjustor assembly 26 being positioned between the servo motor assembly 18 and the servo rear prop assembly 22.

The servo motor assembly 18 attaches to the second side 40 center of the lower. As is known to those having ordinary skill in the art to which the said subject matter pertains, a servo motor assembly 18 is the motor assembly be it electric, hydraulic, thermal-combustion, or any other type of motor, that serves as the final control element in an automatic feedback control system for mechanical motion, and receives power from an amplifier element and drives the load with a linear or rotary motion. Further such a motor assembly includes a starter system or assembly 44 which is positioned proximate a motor (here denoted at 48) and includes a starter 44a, a starter gear 44b, and a starter linkage 44c. The starter system 44 may be, but is not limited to, a manual starter assembly, an on board battery starter assembly, or the like, as is known to those skilled in the art.

With more particularity, the servo motor assembly 18 hereof comprises a plurality of main members and is secured in the center portion of the lower body 32, by at least one and, preferably, two or more motor mounts 50. Each mount extends perpendicularly from the bottom plane of the lower body 32, and is positioned such that the right and obtusely angled vertical inclines, preferably angled at about 81° and 90° from the motor mounts 50, face the front and the rear, respectively.

The motor 48 is secured by the motor mounts 50 by way of two "tap thru" holes 52 in each mount 50 that allow attachments to the cylindrical motor 48 which, in turn, connects to an exhaust assembly 54 from the frontal left half portion, curving around the front of the motor 48, then passing past the motor mounts 50. Proximate the rear dorsal portion of the motor 48, the motor 48 connects to a drive gear 58, and likewise to a drive gear side 60. The drive gear 58 has a ruffled inside diameter and is secured to the drive gear side 60 by any suitable means such as threaded fasteners or the like, where an upward attachment is made to a universal swivel 62.

The steering mount 42 is secured in position by the two motor mounts 50, also, where the steering mount 42 provides an attachment to the starter bracket 64, at a first end thereof. The opposite end of the starter bracket 64 connects to and provides support for the rear of the motor assembly 18. As shown, from the vertical attachment to the steering mount 42, the starter bracket 64 declines downwardly at an angle, and, at the base of the motor mounts 50 curves back upwardly obtusely, preferably, at an angle greater than 130 degrees relative to a horizontal axis. Thus, the starter bracket 64 connects obtusely, from the declined angle of origin, to the rear portion of the motor assembly 18.

The steering mount 42 also supports a lower steering bracket 66. The lower steering bracket 66 comprises a plurality of servos 67, four of which are shown. The bracket 66 is connected anteriorly, posteriorly, and bilaterally to a plurality of first or small steering arms 68a, 68b, 68c, and 68d that are, each, respectively linked to a respective second or large steering arm 70a, 70b, 70c, and 70d by a connecting mechanism. The connecting mechanism comprises a bushing 72 connected to an arm pivot pin 74, and a C-clip 76. Each set of steering arms are, respectively, positioned anteriorly, posteriorly, and bilaterally. The lower steering bracket 66 is, also, connected to an upper pulley bracket 78, which supports a plurality of rod locks 80 (two of which are shown). The rod locks 80 respectively, attach to the associated gear pulleys 82 and gear pulley sides 84 to which the drive belt 86 is strapped and which further connects to the belt adjuster assembly 26, and finally to the rear prop assembly 22.

The universal swivel 62 is upwardly connected to the rotating spindle 87, which anteriorly, posteriorly, and laterally attaches to the pivot rods 88 that link to the respective steering swivels 90, joining the nearer end of the four large steering arms 70a, 70b, 70c, 70d, opposite to the respective small steering arms 68a, 68b, 68c, 68d. The universal swivel 62 serves in the steering of the object 10 by way of the steering arms 68a–d and 70a–d.

The pivot rods 88 are pressed into the rotating spindle 87, and a facial thrust bearing (not shown) is pressed into the spindle so that the assembly can rotate to prevent wedging.

The upper steering bracket 91 links the main symmetrical quadripartite blade 27 to the rotating spindle 87.

Figure 2A:
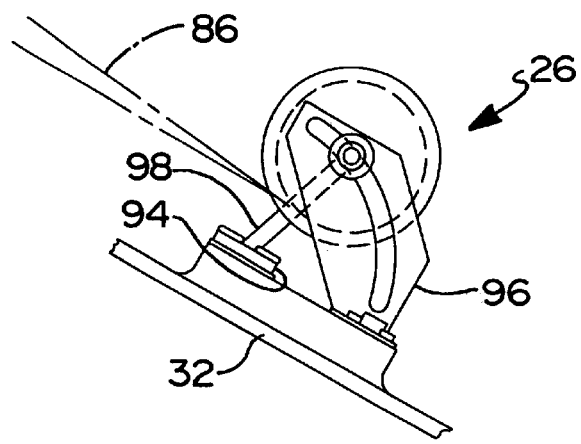
FIG. 2A is a side view of a belt adjustor assembly.
Figure 2B:
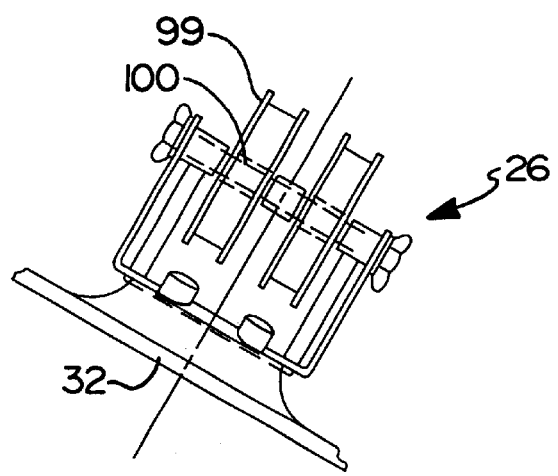
FIG. 2B is a rear view of a belt adjustor assembly.
Figure 3:
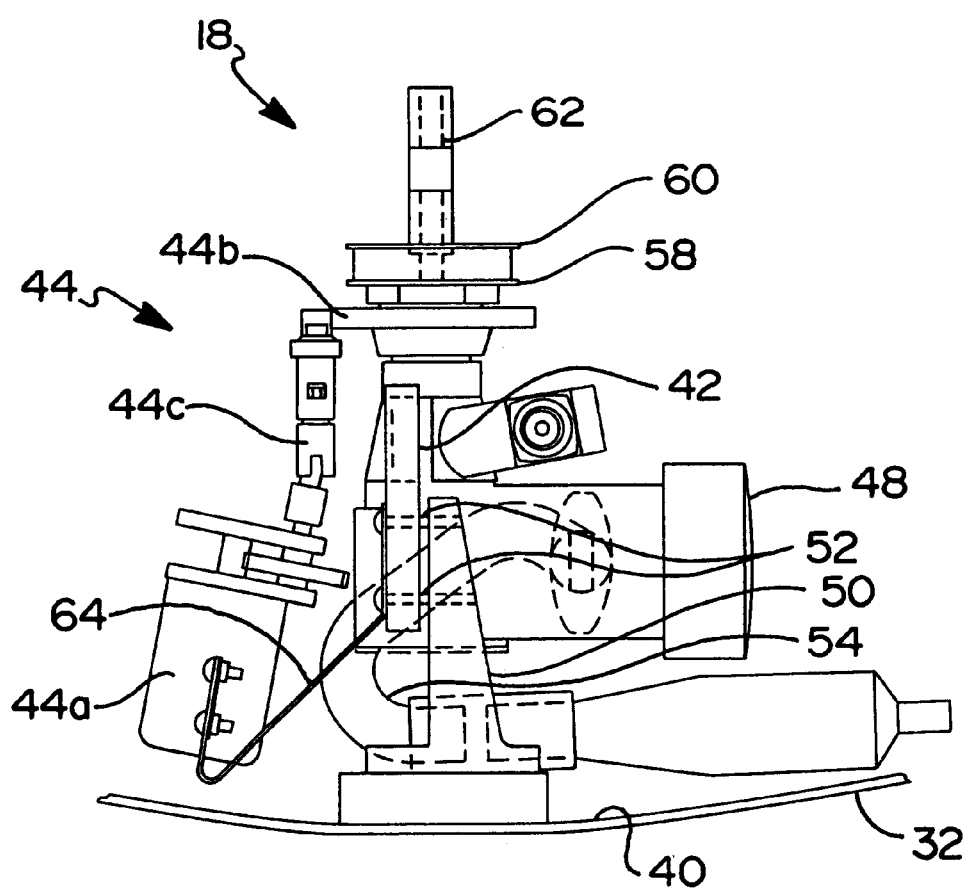
FIG. 3 is a side view of a servo motor assembly.
Figure 4A:
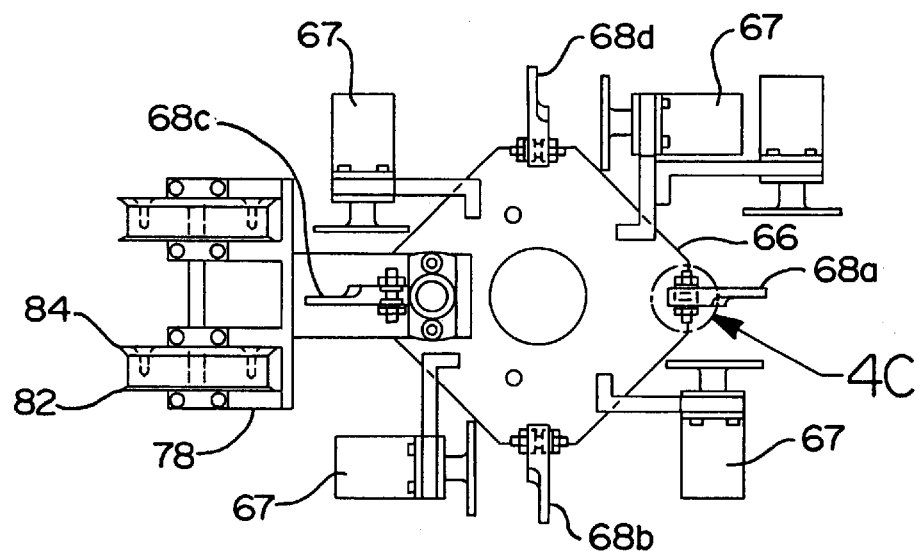
FIG. 4A is a top view of a steering block assembly.
Figure 4B:
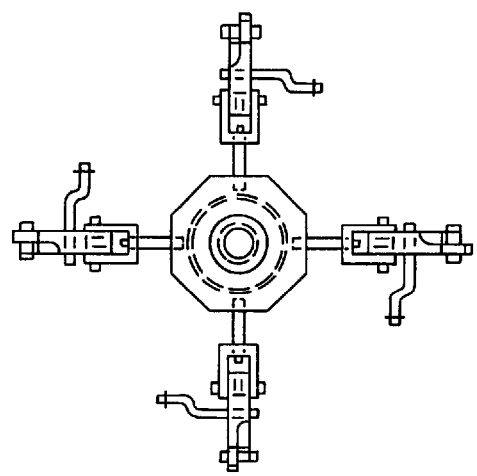
FIG. 4B is a top view of a gear pulley and drive belt of the steering block assembly.
Figure 5:
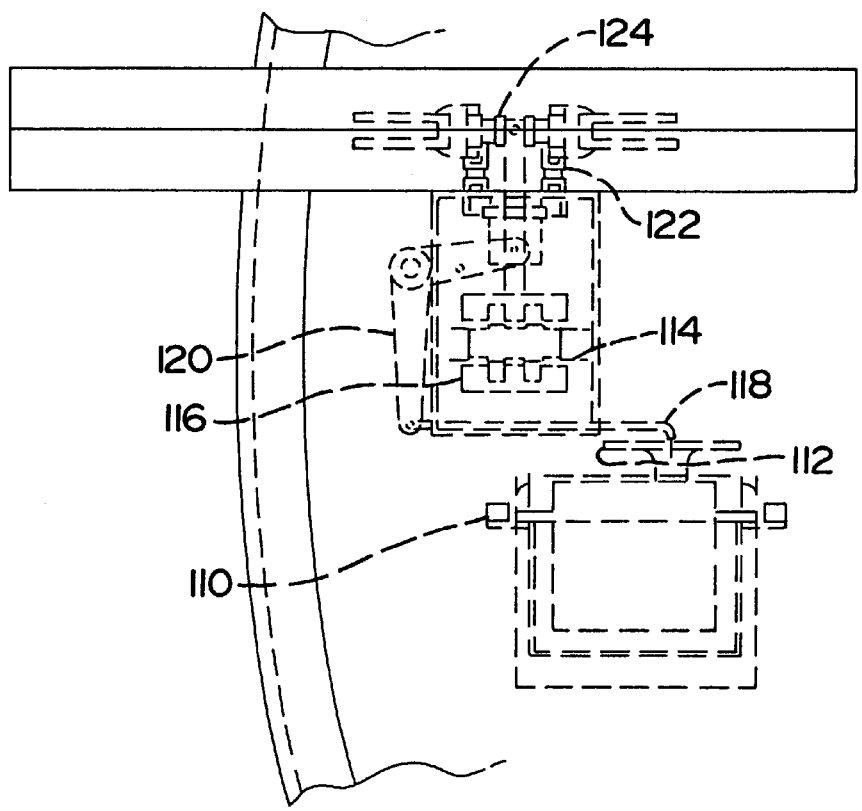
FIG. 5 is a perspective view of a rear propeller assembly.

A belt adjustor assembly 26 such as that shown on FIG. 2, as known to those skilled in the art to which the present invention pertains, is a pulley assembly employed to lessen the counter spinning of the object 10. The drive belt 86 is strapped to the gear pulley 82, the belt adjuster assembly 26, and finally to the rear prop assembly 22.

The belt adjuster assembly 26 comprises a plurality of main members, and is mounted onto the lower body 32. The belt adjuster assembly 26 is positioned posteriorly between the motor assembly and the rear prop assembly 22. Specifically, the adjuster assembly 26 is mounted onto the lower body 32 by way of pivot arm locks 94, at the location where the anterior portion of each pivot arm lock 94 is attached to an adjustor bracket 96 and the posterior portion of each arm lock 94 is attached to the swivel arm 98. The swivel arm 98 in turn, provides support to a pulley rod 100 oppositely rotating pulley discs 99. A means for rotating the rear prop may be any suitable means and is, preferably, cable drives.

The rear prop assembly 22 is mounted to the rear portion of the lower body 32 with a servo side mount box 110 which, in turn, connects to a servo 112. The servo side mount box 110 may be mounted onto the housing by any suitable means. The servo 112 links to the pulley 114 through a pair of connecting rods 116 and 118. Posteriorly interconnected to the pulley 114, the pivot arm 120 serves to apply pressure upon the rear prop assembly 22 to enable aerial control, including lessening counter spinning of the object 10. Moreover, a pitch rod 122 connects to the pulley 114 oppositely from the servo side. The blade arms 124 of the assembly 22 connect to the pulley 114 by way of the pitch rod 122.

As known to those skilled in the art to which the present invention pertains, the control mechanism of the present invention may be any suitable means, but preferably is a nine channel radio-controlled system, including a seventy-two MHz operating system providing a five mile range for controllability. Specifically, the control system preferably comprises the hand-held radio transmitter (not shown) providing the user with the ability to control and maneuver the present invention when it is in flight. Moreover, the control system preferably comprises an on-board radio controlled receiver which receives the signals from the accompanying hand-held transmitter. Although not depicted in the drawings, the control system described above may be of the similar kind to those that are commercially available. Additionally, the position of the on-board radio controlled receiver may be at any efficient or convenient location within the present invention, by any suitably means.

The present invention, thus, provides a new type of device that may be used both as a recreational and surveillance item. Uniquely, this present invention possesses the aerial characteristics that no other similar device of its size possesses. That is, the present invention possesses the ability to continuously revolve throughout the x, y, and z axes. Thus, the present invention fills the void of devices having such aerial characteristics.

Having thus described the invention, what is claimed is:

1. An aerial disc-shaped object comprising:
    a) a framework comprising: an upper body, a lower body, the upper body being connected to the lower body, the bodies cooperating to define a housing;
    b) an automatic feedback control system disposed on the framework;
    c) a servo motor assembly mounted on the lower body for control of mechanical motion, the servo motor assembly having a steering mount;
    d) a tiltable steering assembly mounted on the servo motor by the steering mount;
    e) a servo rear prop assembly, mounted on the lower body to enable aerial control;
    f) a belt adjustor assembly mounted on the lower body for controlling the spinning of the frame;
    g) a rotatable main quadripartite blade assembly connected to the servo motor and extending into the upper body; and
    h) a receiver and remote transmitter system for receiving signals from a transmitter for remotely controlling the object.

2. The object of claim 1, wherein the servo motor assembly copmprises:
    a) a motor;
    b) a starter assembly connected by a starter bracket to the motor comprising a starter, a starter gear connected to the motor, and a starter linkage for connecting the starter to the starter gear;
    c) at least one motor mount connected to the lower body, the motor mount being adapted to mount the motor;
    d) means for mounting the motor to the at least one motor mount;
    e) an exhaust assembly connected to the motor for dissipation of exhaust produced by the motor;
    f) a drive gear connected to the motor; and
    g) a drive gear side secured to the drive gear and further connected to a universal swivel which allows for translation of the rotation to the main quadripartite blade assembly.

3. The object of claim 2, wherein the steering assembly comprises:
    a) a steering mount secured by the at least one motor mount and the starter bracket;
    b) a lower steering bracket connected to a plurality of servos and further comprising a plurality of small steering arms linked by a means for connecting to an associated large steering arm;
    c) an upper pulley bracket connected to the lower steering bracket;
    d) a plurality of rod locks which are supported by the upper pulley bracket and connect to an associate gear pulley which is further connected to an associate gear pulley side;
    e) a drive belt connected to the motor and strapped to the gear pulley and gear pulley side;
    f) a rotating spindle attached to the motor and a universal swivel and further attached to a plurality of pivot rods linked to a plurality of steering swivels, the steering swivels connected to the large steering arms, the large steering arms connected to the plurality of small steering arms; and
    g) an upper steering bracket for linking the main quadripartite blade assembly to the rotating spindle.

4. The object of claim 1, wherein the belt adjustor assembly comprises:
    a) at least one pivot lock arm mounted on the lower body and further connected to a swivel arm and an adjustor bracket;
    b) a pulley rod supported by the swivel arm; and
    c) two oppositely rotating pulleys disposed on the pulley rod and strapped to the drive belt.

5. The object of claim 1, wherein the servo rear prop assembly comprises:
    a) a servo side box mounted on the lower body;
    b) a servo connected to the servo side box;
    c) a pulley linked to the servo by a pair of connecting rods;
    d) a pivot arm connected to the pulley; and
    e) a pitch rod connected to the pulley for linking a blade arm to the pulley.

6. The object of claim 1, wherein the receiver and remote transmitter system comprises a radio controlled system.

7. The object of claim 6, wherein the radio controlled system comprises:
    a) an onboard radio controlled receiver mounted on the object; and
    b) a radio transmitter for transmitting directional control signals to the object.

* * * * *